US012052806B2

(12) United States Patent
Wu et al.

(10) Patent No.: US 12,052,806 B2
(45) Date of Patent: Jul. 30, 2024

(54) RECTIFYING ARRANGEMENT OF A DRIVER FOR AN LED LIGHTING UNIT

(71) Applicant: SIGNIFY HOLDING B.V., Eindhoven (NL)

(72) Inventors: Xiujuan Wu, Shanghai (CN); Han Lu, Shanghai (CN); Jing Yang, Shanghai (CN); Li Wei Sun, Shanghai (CN); Xiaofeng Wang, Shanghai (CN); Zhaoting Li, Shanghai (CN); Deyong Kong, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/927,991

(22) PCT Filed: Jun. 15, 2021

(86) PCT No.: PCT/EP2021/066026
§ 371 (c)(1),
(2) Date: Nov. 28, 2022

(87) PCT Pub. No.: WO2021/254988
PCT Pub. Date: Dec. 23, 2021

(65) Prior Publication Data

US 2023/0225029 A1 Jul. 13, 2023

(30) Foreign Application Priority Data

Jun. 16, 2020 (WO) ................ PCT/CN2020/096372
Aug. 17, 2020 (EP) ..................................... 20191330

(51) Int. Cl.
*H05B 45/50* (2022.01)
*H05B 45/3578* (2020.01)

(52) U.S. Cl.
CPC ......... *H05B 45/50* (2020.01); *H05B 45/3578* (2020.01)

(58) Field of Classification Search
None
See application file for complete search history.

(56) References Cited

U.S. PATENT DOCUMENTS

| | | | | |
|---|---|---|---|---|
| 9,743,466 | B2 | 8/2017 | Tao et al. | |
| 2010/0289418 | A1 | 11/2010 | Langovsky | |
| 2012/0026761 | A1 | 2/2012 | Young | |
| 2012/0206064 | A1 * | 8/2012 | Archenhold ......... | H05B 45/385 315/297 |

(Continued)

FOREIGN PATENT DOCUMENTS

| | | | |
|---|---|---|---|
| EP | 2866526 | A1 | 4/2015 |
| WO | 2020002040 | A1 | 1/2020 |
| WO | 2020114811 | A1 | 6/2020 |

*Primary Examiner* — Anh Q Tran

(57) ABSTRACT

A rectifying arrangement for an LED driver comprising a rectifying circuit and a clamping arrangement provides a low-impedance path between input terminals of the rectifying circuit in response to an abnormal operation of the rectifying arrangement, such as an open circuit of one rectifying branch of the rectifying arrangement. The low-impedance path is maintained for a plurality of cycles of an AC power supply provided to the rectifying circuit, and can be maintained on a (semi-)permanent basis.

13 Claims, 3 Drawing Sheets

(56) References Cited

U.S. PATENT DOCUMENTS

| | | | | |
|---|---|---|---|---|
| 2012/0286663 | A1* | 11/2012 | Puvanakijjakorn .. | H05B 45/355 315/85 |
| 2013/0049589 | A1* | 2/2013 | Simi .................... | H05B 45/385 315/206 |
| 2014/0197738 | A1 | 7/2014 | Perazella | |
| 2014/0239834 | A1 | 8/2014 | Choi et al. | |
| 2015/0222109 | A1* | 8/2015 | Wang ....................... | H05K 9/00 315/246 |
| 2017/0245341 | A1 | 8/2017 | Lee | |
| 2019/0215919 | A1 | 7/2019 | Fang et al. | |

* cited by examiner

RECTIFYING ARRANGEMENT OF A DRIVER FOR AN LED LIGHTING UNIT

CROSS-REFERENCE TO PRIOR APPLICATIONS

This application is the U.S. National Phase application under 35 U.S.C. § 371 of International Application No. PCT/EP2021/066026, filed on Jun. 15, 2021, which claims the benefits of European Patent Application No. 20191330.8, filed on Aug. 17, 2020, and Chinese Patent Application No. PCT/CN2020/096372, filed on Jun. 16, 2020. These applications are hereby incorporated by reference herein.

FIELD OF THE INVENTION

The present invention relates to the field of LED lighting units, and in particular, to rectifying arrangements for drivers of (retrofit) LED lighting units.

BACKGROUND OF THE INVENTION

In the field of lighting, there has been a growing interest in LED lighting units for replacing or retrofitting older lighting units, and in particular gas discharge lamps such as high-intensity discharge (HID) lamps or fluorescent lamps. These retrofit LED lighting units need to be appropriately designed so that they are able to draw power from a power source that was originally designed for powering the gas discharge lamp. Basically it has a rectifying arrangement to convert the AC power from the ballast to DC power for the LED.

One type of power source, a “Type A” source, is a power source that has been minimally unaltered since its design for providing power to an HID lamp, and therefore comprises a mains supply (e.g. from the AC mains grid) connected to a ballast. The ballast is typically formed of an electromagnetic (EM) ballast (e.g. comprising a fairly large inductor to ballast the current to counteract the negative impedance characteristic of the gas discharge lamp), and may comprise an igniter and (optionally) a compensation capacitor.

There is an ongoing interest and desire to improve the operation of drivers suitable for such retrofit LED lighting units. In particular, there is a desire to improve a safety and/or power efficiency of such drivers, and to ensure that the retrofit LED lighting units comply with regulations and/or standards. More specifically, if there is an abnormal/fault in the retrofit LED lighting units, it is desired that the ballast is protected. PCT/EP2019/082341 discloses a protection method that uses a shunt switch.

US20100289418A1 and US20120026761A1 discloses using a surge suppressor before a rectifier. US20140239834A1 discloses a starter before a rectifier of a LED lamp can be short circuited at particular point of time.

SUMMARY OF THE INVENTION

As explained in PCT/EP2019/082341, ballast saturation is dangerous. In abnormal operation of the rectifying arrangement, it may cause an unbalanced output of the ballast and finally saturate the ballast. For example, one polarity of the output is stopped due to the abnormal operation. In the other polarity, since the inductor cannot demagnetize in the polarity in which the input/output has been stopped, the output in the other polarity would rise uncontrollably, saturating the ballast, resulting in overcurrent and/or overheating. A basic idea of embodiments of the invention is to effectively short circuit the input terminals of a rectifying arrangement when an abnormal operation of the rectifying arrangement occurs. This short circuit is maintained for a plurality of continuous cycles of the input power to prevent the unbalance for a substantially long time period, and may be semi-permanent or permanent. This approach can prevent an unbalance in the output of the ballast, which unbalance may cause overcurrent or overheating of the ballast. In a more specific embodiment, the abnormal operation of the rectifying arrangement comprises an sudden open circuit of one rectifying branch, and a large voltage differential occurring across the input terminals of the rectifying arrangement (e.g. due to a sudden change of current through an inductor of a ballast connected to rectifying arrangement) triggers a protection component to short circuit the input terminals of the rectifying arrangement.

More specifically, it has been recognized that an abnormal operation of the rectifying arrangement, such as an open circuit in a rectifying branch of the rectifying arrangement, can result in a sudden change stop in current though an inductor of an electromagnetic ballast of an AC power source providing AC power to the rectifying arrangement. This sudden change stop in current may therefore induce a reverse voltage on the inductor which reverse voltage further superimposes with the AC mains input and generates an extremely high amplitude (though its polarity may either be positive or negative) voltage across the input terminals. This concept presented in this disclosure thereby allow for a safer lighting unit, which can comply with regulations and/or standards. Since the input of the lighting unit is short circuited, the output of the ballast is thereby short circuited, so that the ballast's output is pure AC and no DC component. Such regulations/standards may require there to be no DC component induced in the rectifying arrangement or downstream electrical components of the lighting unit during abnormal operation of the lighting unit. By short circuiting the input terminals, this high voltage can be quickly dissipated, to reduce the likelihood of damage to other components of the lighting unit and improve a safety of a lighting unit containing the rectifying arrangement.

The proposed mechanism is capable of providing a safer lighting unit even for a rectifying arrangement configured to rectify a low frequency alternating current obtained from a low-frequency AC power source. In particular, the proposed rectifying arrangement is capable of operating even with a low-frequency AC power source.

The invention is defined by the claims.

According to examples in accordance with an aspect of the invention, there is provided a rectifying arrangement, adapted to be used with an electromagnetic ballast with an inductor, for an LED driver of an LED lighting unit. The rectifying arrangement comprises a rectifying circuit and a clamping arrangement.

The rectifying circuit comprises an input arrangement formed of two input terminals configured to connect to an alternating current, AC, power source, an output arrangement formed of one or more output terminals, and rectifying circuitry connected between the input and output arrangement and configured to rectify an AC voltage received at the input arrangement from the AC power source to provide output DC voltage at the output arrangement.

The clamping arrangement is connected between the two input terminals of the input arrangement of the rectifying circuit. The clamping arrangement is configured to, in response to an abnormal operation of the rectifying circuit: provide a low-impedance path between the two input terminals of the input arrangement; and continually maintain the low-impedance path between the two input terminals for at least a plurality of continuous/consecutive cycles of the AC current received at the input arrangement, wherein the abnormal operation of the rectifying circuit is an open circuit of one rectifying branch of the rectifying circuit such that the electromagnetic ballast could only output current in one polarity of the AC cycles which causes the clamping arrangement to receive an increased input voltage from the electromagnetic ballast, exceeding a threshold magnitude, due to voltage induction caused by the open circuit of the one rectifying branch of the rectifying circuit.

The present disclosure proposes a mechanism that facilitates safe operation of the driver for the LED lighting unit. In particular, the input terminals of a rectifying arrangement are effectively short-circuited in response to an abnormal operation of the rectifying arrangement which abnormal operation is a single open circuit fault of the rectifying circuit of the rectifying arrangement.

Importantly, if the EM ballast could only output current in one polarity of the AC cycles, it could make an electromagnetic ballast (of an AC power source providing power to the rectifying arrangement) saturate. If the inductor saturates, its output current in the one polarity is uncontrolled high and this can harm internal components of the EM ballast itself (making the inductor overheat), as well as the LED lighting arrangement (due to the overcurrent output from the inductor).

Also, this can prevent or reduce the likelihood that a large voltage differential will be present between the two input terminals when the rectifying arrangement behaves abnormally, thereby improving a safety and longevity of the rectifying arrangement and any connected components (e.g. the AC power source or a LED lighting unit employing the rectifying arrangement). In particular, electrically downstream components can be protected or shielding from a large voltage surge.

Thus, the present disclosure recognizes a benefit to avoiding unbalanced output/input voltage for an EM ballast, and a large voltage differential occurring between the two input terminals of the rectifying arrangement, e.g. when the rectifying circuit behaves abnormally (e.g. an open circuit forms).

In the context of the present disclosure, a low-impedance path is any electrical connection that has a relatively low impedance and/or voltage drop (e.g. compared to other paths of the electrical circuitry), e.g. an impedance of below 100Ω or, more preferably, below 50Ω, or even zero Ohm. A zero Ohm output impedance would not damages the EM ballast since the EM ballast itself limits the output/input current. This would be well understood by the person skilled in the art. Thus, a low-impedance path effectively acts as a short circuit between the two terminals of the input arrangement.

Keeping the low-impedance path between the two input terminals for at least a plurality of continuous/consecutive cycles of the AC current means that current continues to flow through the clamping arrangement for multiple half cycles of the AC power, making the power provided to the load substantially the same during both half cycles. Thus, even though the bridge diode is open, the lamp current and voltage stay as a symmetrical wave, with no DC component induced.

The present disclosure avoids the need for a decoupling or blocking capacitor to block a DC component to the rectifying arrangement (e.g. a capacitor that couples the rectifying arrangement to the AC power source). For low frequency AC power sources, such a decoupling/blocking capacitor could otherwise prevent or reduce a power transfer from the AC power source to the rectifying arrangement. The present disclosure proposes a safer rectifying arrangement which is suitable for use with low frequency AC power sources, i.e. which can omit a coupling/blocking capacitor coupling the rectifying arrangement to the AC power source.

Preferably, the AC voltage received at the input arrangement has a frequency no greater than 1 kHz, for example, no greater than 500 Hz, for example, no greater than 100 Hz (e.g. 50/60 Hz).

The clamping arrangement may be configured, before an abnormal operation of the rectifying circuit occurs, to not provide a low-impedance path between the two input terminals of the input arrangement.

The clamping arrangement may be configured to, in response to the abnormal operation of the rectifying circuit, continually maintain the low-impedance path between the two input terminals for a substantially permanent period of time. This means the clamping arrangement is not recoverable. Since an open circuit of the rectifier branch is also often not recoverable, for example the rectifying diode fails and will remain open forever, the lamp is not suitable for use any more. Thus it is reasonable to configure that the clamping arrangement is not recoverable any more, avoiding the user to repeatedly attempting to power on/off the lamp and cause repeated triggering which may result in risks. In the context of the present disclosure, "substantially permanent" may mean permanent without external intervention.

The clamping arrangement may be configured to permanently maintain the low-impedance path between the two input terminals in response to the abnormal operation of the rectifying circuit.

In the context of the present disclosure, "permanently" is intended to mean within reasonable bounds for the normal operation of the rectifying arrangement, i.e. continued operation of the rectifying arrangement in the originally designed and intended manner will result in the clamping arrangement being made continually low-impedance.

In particular, in some embodiments, "permanently" can be interpreted to mean until one or more components of the clamping arrangement are removed and/or replaced, i.e. until there is some physical external intervention.

In some examples, the abnormal operation of the rectifying circuit is adapted to cause a voltage across the clamping arrangement exceeding a threshold magnitude. For example, in at least one embodiment, the abnormal operation of the rectifying circuit is open circuit in one polarity of the rectifying circuit which results in a voltage across the clamping arrangement exceeding a threshold magnitude.

The voltage between the two input terminals exceeding a threshold magnitude may indicate an abnormal operation of the rectifying circuit, such as an open circuit. In particular, if an AC power source providing power to the rectifying arrangement has an electromagnetic ballast (e.g. an inductor), then an open circuit in the rectifying arrangement will cause an abrupt or (near-)step change in the current flowing through the electromagnetic ballast. This would result in a large voltage appearing at the input terminal electrically upstream of the open circuit.

The threshold magnitude may be larger than 1.25 times the forward voltage of the LED lighting unit.

The threshold magnitude may be no less than 1.25 times (preferably, no less than 1.5 times and more preferably, no less than 1.75 times) the size of the forward voltage of an LED arrangement that draws power from the output terminal of the rectifying arrangement (e.g. of the LED lighting unit).

The threshold voltage may be no less than 1.25 times, for example, no less than 1.5 times, for example no less than 2 times the maximum voltage of the AC power that the AC power source is configured to supply, when no abnormal operation takes place (e.g. during normal operation). This can help avoid the clamping arrangement from providing the low impedance path during conventional or normal operation of the rectifying arrangement.

Optionally the threshold magnitude is less than 300V. In traditional EM ballast, if the output current is suddenly stopped, the induced voltage plus the input voltage (meaning the output overvoltage at the ballast output) is usually larger than 300V. Therefore, setting the threshold magnitude less than 300V can accurately detect this overvoltage event caused by current stopped by open circuit.

Optionally, the threshold magnitude may be no more than 4 times (preferably, no more than 3 times and more preferably, no less than 2 times) the size of the forward voltage of an LED arrangement that draws power from the output terminal of the rectifying arrangement (e.g. of the LED lighting unit).

Optionally, the threshold magnitude may be no more than 4 times (preferably, no more than 3 times and more preferably, no less than 2 times) the size of the maximum voltage of the AC power that the AC power source is configured to supply, when no abnormal operation takes place (e.g. during normal operation).

The clamping arrangement may comprise a bidirectional conductive and non-recoverable component comprising diode for alternating current, DIAC, type or Thyristor Surge Suppressors, TSS, type component connected between the two input terminals of the rectifying circuit. Many "off-the-shelf" DIAC or TSS components are unidirectional (meaning the other polarity would still be non-conductive in the event that an overvoltage triggers the component to become conductive in one polarity) and recoverable (meaning the component becomes non-conductive again when the overvoltage ceases), those components are not applicable for the embodiments of the invention. By comparison, an embodiment of the invention may require the use of a component that can, non-recoverably, become a bidirectionally conductive component.

In some examples, the rectifying circuitry comprises a bridge rectifier including four rectifying branches, wherein at least one branch comprises at least two diodes, and preferably wherein the abnormal operation of the rectifying circuit comprises an open circuit of one rectifying branch.

The rectifying arrangement may further comprise a capacitor connected to the output arrangement and configured to smooth an output DC current provided by the output arrangement. In some examples, the one or more output terminals comprise two output terminals, and the capacitor may be connected between the two output terminals.

There is also proposed an LED lighting unit to be used with an electromagnetic ballast for gas discharge lamp. The LED lighting unit comprises the rectifying arrangement previously described; and an LED arrangement, comprising one or more LEDS, configured to receive power from the output arrangement of the rectifying arrangement.

The LED lighting unit may further comprise an LED driver configured to convert the output DC voltage to a different DC voltage for powering the LED arrangement.

Preferably, the LED lighting unit does not comprise a decoupling capacitor to connect between the output of the AC power source and the input arrangement. It is recognized that the proposed rectifying arrangement is capable of providing a safe operation even with a low-frequency AC power source.

There is also proposed an LED lighting arrangement comprising: the rectifying arrangement previously described; and an AC power source configured to receive a mains AC power from a mains supply and provide an AC power to the input arrangement of the rectifying arrangement, wherein said AC power source comprises an electromagnetic ballast for a gas discharge lamp.

The LED lighting arrangement may further comprise an LED arrangement, comprising one or more LEDS, configured to receive power from the output arrangement of the rectifying arrangement.

The LED lighting unit arrangement may further comprise an LED driver configured to convert the output DC voltage to a different DC voltage for powering the LED arrangement.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
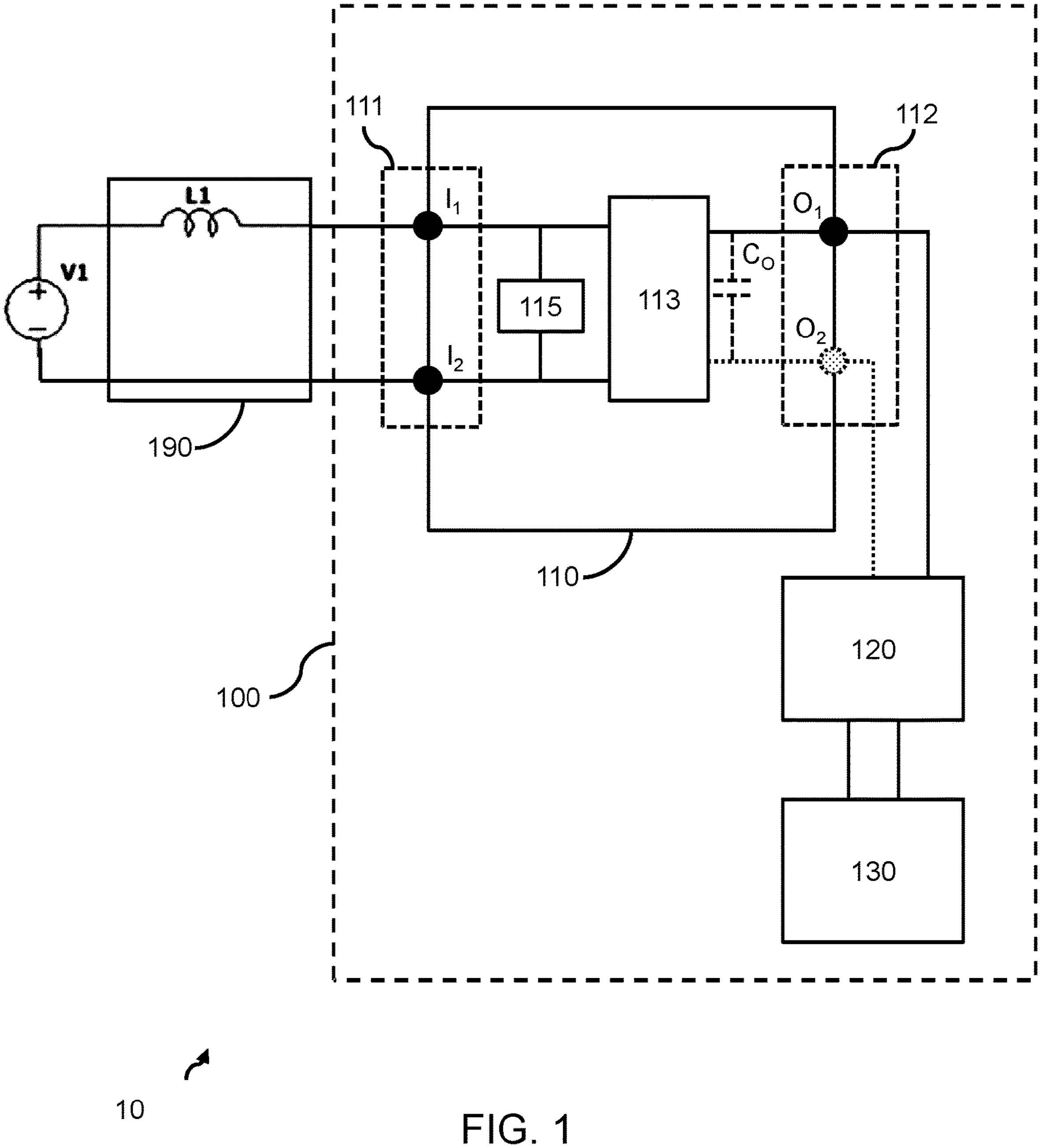
FIG. 1 is a block diagram illustrating components of an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a rectifying arrangement for an LED driver. A clamping arrangement provides a low-impedance path between input terminals of the rectifying arrangement in response to an abnormal operation of the rectifying arrangement, such as an open circuit. The low-impedance path is maintained for a plurality of cycles of an AC power supply provided to the rectifying circuit, and can be maintained on a (semi-) permanent basis.

FIG. 1 is a block diagram conceptually illustrating different components of an embodiment. In particular, FIG. 1 illustrates an LED lighting arrangement 10, comprising a lighting unit 100 and an AC power source 190.

The lighting unit 100 is formed of a rectifying arrangement 110, an LED driver 120 and an LED arrangement 130

(comprising a plurality of LEDs, not shown). The LED lighting arrangement 10, the lighting unit 100 and the rectifying arrangement 110 provide different embodiments. In some embodiment, the driver 120 could be a switched mode power supply, a shunt switch power supply, or even a direct connection, without power conversion, that directly connects the LED arrangement 130 to the output 113 of the rectifying arrangement 110.

The AC power source 190 is configured to provide an AC power (e.g. an AC current, AC voltage or AC signal) to the lighting unit 100, and in particular to the rectifying arrangement 110. The AC power source may, for example, receive a mains AC power from a mains supply V1, and convert the mains AC power to the AC power provided to the lighting unit. The AC power source may have been initially designed for a gas discharge lamp, such as a high-intensity discharge (HID) lamp or fluorescent lamp.

In preferable examples, the AC power source 190 may comprise an electromagnetic (EM) ballast having an inductor L1 (e.g. with an inductance of 5*h*), configured for use in converting a mains AC power to an AC power for powering a gas discharge lamp.

The rectifying arrangement 110 of the lighting unit 100 is configured to receive the AC power from the AC power source 190 at an input interface 111. The input interface comprises at least two input terminals: a first terminal $I_1$ and a second terminal $I_2$. The input interface 111, and therefore the rectifying arrangement 110, may therefore receive a differential input from the AC power source 190.

The rectifying arrangement 111 is configured to rectify an AC voltage received at the input arrangement 111 to provide output DC voltage at an output arrangement 112. The rectifying is performed by rectifying circuitry 113, connected between the input arrangement 111 and the output arrangement 112.

The output arrangement 112 comprises one or more output terminals: e.g. a first output terminal $O_1$ and (optionally) a second output terminal $O_2$). The power provided at the output arrangement is a DC voltage. If there are two terminals, the DC voltage may be a voltage between the two terminals. If there is a single terminal, the DC voltage maybe a voltage between the single terminal and a ground/reference voltage (e.g. an Earth).

As previously noted, the rectifying of the AC power is performed by rectifying circuitry 113. Various forms of rectifying circuitry could be used, e.g. a half-bridge rectifier, a full-bridge rectifier. The rectifying circuit may, for example, employ a plurality of diodes to rectify (i.e. place all half-cycles in a same polarity) the AC power received form the AC power source 190.

The input interface 111, the output interface 112 and the rectifying circuitry together form a rectifying circuit.

The rectifying arrangement 110 further comprises a clamping arrangement 115, which is connected between the two input terminals $I_1$, $I_2$ of the input arrangement 111.

The clamping arrangement 115 is configured to, in response to an abnormal operation of the rectifying circuit 110, provide a low-impedance path between the two input terminals of the input arrangement; and continually maintain the low-impedance path between the two input terminals for at least a plurality of continuous/consecutive/successive cycles of the AC current received at the input arrangement.

In other words, if an abnormal operation of the rectifying arrangement occurs, the clamping arrangement may effectively short circuit the two input terminals together, by providing a low-impedance path between the two input terminals. In the context of the present disclosure, "low-impedance" is relative to the impedance of other components of the lighting unit (and in particular, other paths of the rectifying arrangement).

Preferably, the low impedance path has an impedance of below 100Ω or, more preferably, below 50Ω, or even more preferably, below 20Ω. In particularly preferable examples, the impedance is negligible.

Thus, the clamping arrangement 115 may respond to an abnormal operation of the rectifying arrangement by providing a low impedance path between the input terminals of the input arrangement, to effectively short circuit the input terminals in both positive and negative polarity of the AC output from the AC power source 190. This enables a symmetrical AC output from the AC power source 190 and avoid a DC component in it, preventing the inductor being saturated and overcurrent. It also avoids a high-voltage potential existing between the input terminals when an abnormal operation of the rectifying arrangement occurs, or quickly dissipates any high-voltage potential induced when an abnormal operation of the rectifying arrangement occurs.

The clamping arrangement is configured to continually maintain the low-impedance path between the two input terminals for at least a plurality of continuous (i.e. consecutive or successive) cycles of the AC current received at the input arrangement. In particular examples, the clamping arrangement may be configured to (semi-)permanently provide the low impedance path between the two input terminals.

Thus, the low-impedance path may be maintained for a period of time greater than the time taken for a number of cycles of the input power to occur. This can be achieved through appropriate selection of electrical components for connecting the two input terminals to one another.

In some examples, the clamping arrangement may be analogous to a fuse, except that instead of switching from acting as a closed circuit to acting as an open circuit, the clamping arrangement may instead switch from acting as an open circuit to acting as a closed circuit. Thus, the clamping arrangement may effectively permanently (without external intervention) act as a short circuit, i.e. provide a low-impedance path, even if the rectifying arrangement is powered off and on again.

As one example, some forms of diodes for alternating current (DIAC) or Thyristor Surge Suppressors can be configured to permanently (e.g. irreversibly) become low-impedance when some electronic condition is met (e.g. a voltage across the component exceeds a threshold magnitude). One example is the K1050SA DIAC.

In some examples, the clamping arrangement may comprise a component (such as a bidirectional diode) that is configured to undergo permanent and bidirectional damage/breakdown (e.g. if a voltage difference across the component exceeds some threshold magnitude). This permanent damage may cause the component to become (semi-)permanently conductive. This characteristic can be exploited.

In yet other examples, the clamping arrangement may comprise a component that becomes conductive when heated, e.g. a thermistor. A high voltage differential across this component may cause it to heat up, resulting in a low-impedance path. The heat may be retained by the component for a plurality of cycles of the AC power, causing the low-impedance path to be provided for a plurality of cycles.

These are only some examples, and the skilled person would be readily capable of using other variants.

The abnormal operation of the rectifying arrangement 110 may be an sudden open circuit of one rectifying branch of the rectifying circuitry 113 during the operation, which causes voltage between the input terminals $I_1$, $I_2$ exceeding a threshold voltage. This voltage exceeding the threshold voltage can result from the sudden change in current flow (as no current can flow in the open circuit) in the inductor L1. A sudden change in current flow in the inductor L1 can result in a large voltage being induced by the inductor L1 of the AC power source 190 (following Faraday's law).

Figure 2:
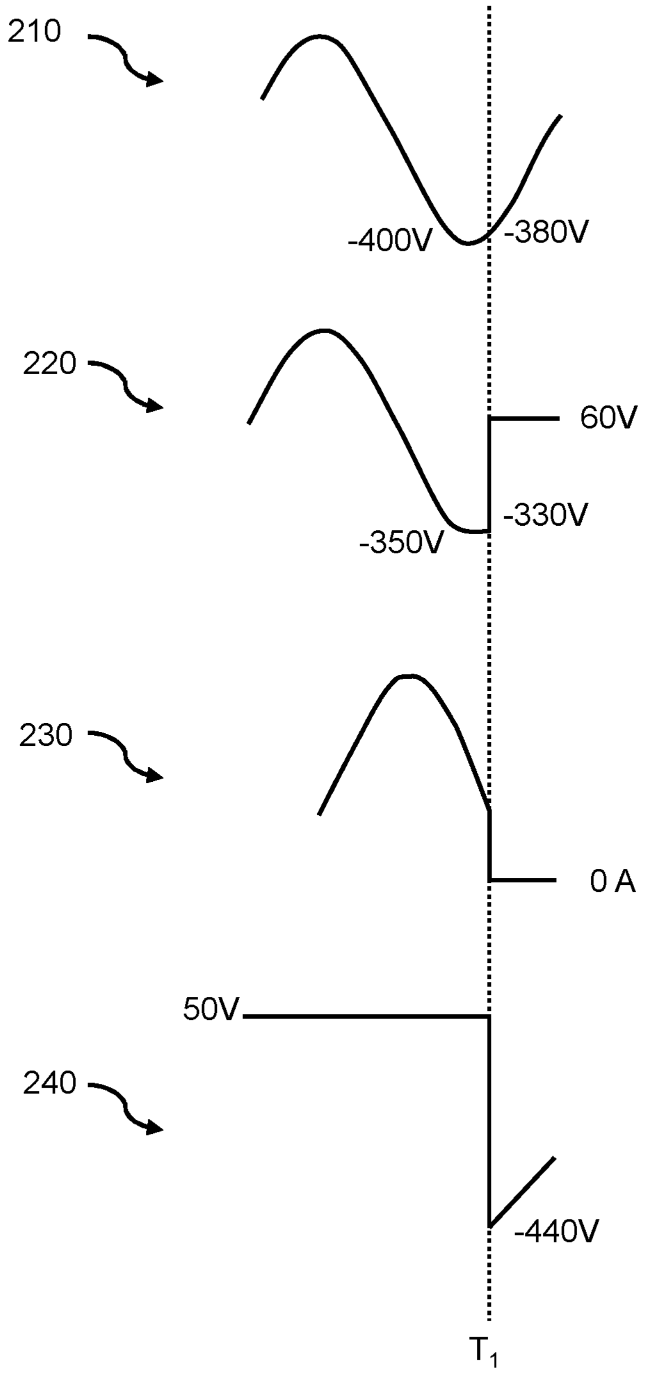
FIG. 2 provides partial waveforms for understanding a concept of the disclosure.

FIG. 2 provides partial waveforms to improve a conceptual understanding of this phenomenon. FIG. 2 illustrates the effect of a sudden open circuit in the rectifying arrangement illustrated in FIG. 1 (assuming that the clamping arrangement 190 is omitted).

A first waveform 210 illustrates a voltage $V_{V1}$ (peak amplitude is +/−400V) across the supply V1 of the AC power source 190. A second waveform 220 illustrates a voltage $V_L$ across the inductor L1 of the AC power source 190. the $V_L$ is a little less, for example 50V (the forward voltage of LEDs) than the $V_{V1}$ in normal operation, and its peak amplitude is +/−350V for example. A third waveform illustrates a current $I_L$ through the inductor L1 of the AC power source 190. A fourth waveform illustrates a voltage between the two input terminals $I_1$, $I_2$ of the input interface of the rectifying arrangement 110, which is equal to $V_{V1}-V_L$ in normal operation, for example the forward voltage 50V of the LEDs.

At a time $T_1$ in the negative polarity of the voltage $V_{V1}$, the $V_{V1}$ is −380V and the $V_L$ is −330V. There is a sudden/abrupt stop in the current through the inductor L1 (see the third waveform 230), caused by a break in the rectifying arrangement. Curve 230 shows this and the current goes to zero. This causes a corresponding change/reverse in the voltage output by the inductor, i.e. a reverse voltage is induced, see the second waveform 220. The reverse voltage could be as large as above +100V or just a medium voltage of around +60V, depending on the inductance and dI/dt. Throughout this period, the voltage across the supply V1 is maintained, as it is a mains supply voltage, as illustrated by the first waveform 210, say it is −380V. The change in the voltage across the inductor induces a corresponding change in the voltage between the two input terminals $I_1$, $I_2$, see the fourth waveform. $V_{V1}-V_L=-380V-60V=-440V$. Thus, a voltage of an extremely large magnitude is induced across the input terminals $I_1$, $I_2$ of the rectifying arrangement.

For the sake of improved understanding, the skilled person would readily recognized that the voltage ($V_L$) across an inductor can be modelled using the following equation:

$$V_L = L_L\frac{dI_L}{dt} \quad (1)$$

where $V_L$ is the voltage across the inductor, $L_L$ is the inductance of the inductor and $$\frac{dI_L}{dt}$$

or $dI_L/dt$ is the instantaneous change in current through the inductor. From the above, it will be appreciated that a sudden step change in current, e.g. caused by an open circuit in the rectifying arrangement, will induce a large reverse voltage output by the inductor (and thereby between the input terminals $I_1$, $I_2$ of the rectifying arrangement 110).

Put another away, the abnormal operation of the rectifying arrangement may be the occurrence of an open circuit in the rectifying arrangement. The input voltage at $I_1$ and $I_2$ is the V1 voltage minus L1 voltage. Since L1 voltage reverses, it causes an amplitude-increased input voltage across the input terminals from an electromagnetic ballast due to voltage induction.

Specifically, where the rectifying arrangement comprises at least one rectifying branch, the abnormal operation may be the occurrence of an open circuit in one of the branches an increased input voltage from the electromagnetic ballast due to voltage induction.

Other causes for a sudden voltage increase between the input terminals will be apparent to the skilled person.

One or more electronics components that (semi-) permanently breakdown when a voltage exceeding a threshold magnitude is present across the component(s) may be used to provide a low-impedance path between the input terminals in both polarities of the AC output in response to an abnormal condition of the rectifying arrangement. Thus, the clamping arrangement may comprise one or more of these electronic components. Suitable examples of such electronic components have previously been described.

The threshold voltage may be determined, for example, based on a forward voltage of the connected LED arrangement and/or of the (maximum) voltage provided by the AC power source (when there is no abnormal operation).

The threshold voltage may be no less than 1.25 times, for example, no less than 1.5 times, for example no less than 2 times the maximum voltage of the AC power that the AC power source is configured to supply, when no abnormal operation takes place (e.g. during normal operation). This provides a safe margin that the normal operation would not trigger the protection.

The threshold magnitude may be no less than 1.25 times, for example, no less than 1.5 times, for example no less than 2 time the forward voltage of the LED lighting unit.

Optionally the threshold magnitude is less than 300V. In EM ballast, if the output current is suddenly stopped, the induced voltage plus the input voltage (meaning the output overvoltage at the ballast output) is usually larger than 300V. Therefore, setting the threshold magnitude less than 300V can accurately detect this overvoltage event caused by current stopped by open circuit.

It will be apparent that, before the abnormal operation of the rectifying arrangement, the clamping arrangement may be configured to not provide a low-impedance path between the two input terminals of the input arrangement. Thus, before an abnormal operation, the clamping arrangement may effectively act as an open circuit connection.

The rectifying arrangement 110 may further comprise a capacitor $C_O$ connected to the output arrangement $O_1$, $O_2$ and configured to smooth an output DC current provided by the output arrangement. This capacitor may be connected between two output terminals of the output arrangement.

The LED driver 120 may be configured to receive the DC power output at the output arrangement 112 of the rectifying arrangement, and convert the DC power into a suitable DC power for powering the LED arrangement 130. Suitable LED drivers would be readily apparent to the skilled person and may comprise, by way of example, a switched mode power supply, a voltage divider, a buck and/or boost converter and so on. The LED driver 120 may be further configurable to control an operation of the LED arrangement (e.g. to selectively provide power to certain LEDs of the LED arrangement).

The LED arrangement 130 comprises one or more LEDs configured to draw power from the DC power provided by the output arrangement 112 of the LED arrangement. The LED arrangement may comprise any suitable arrangement or array of LEDs, as would be appreciated by the skilled person. For example, the LED arrangement 130 may comprise a string of LEDs, two or more parallel strings of LEDs, an LED array and so on.

Figure 3:
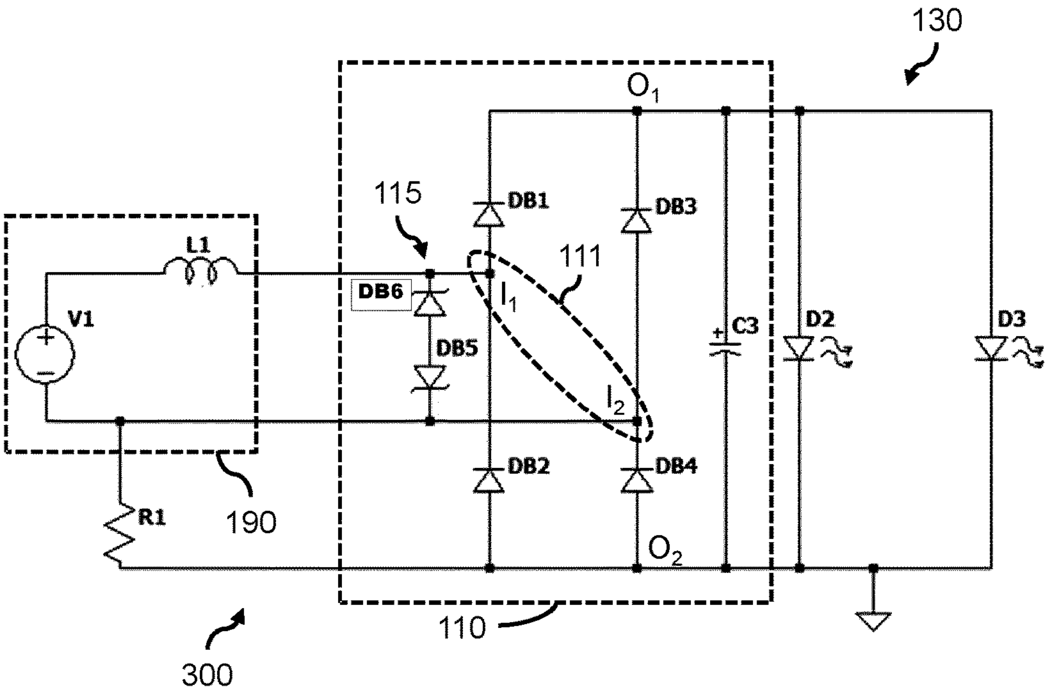
FIG. 3 is a circuit diagram illustrating an embodiment.

FIG. 3 is a circuit diagram illustrating components of an LED lighting arrangement 300 comprising a rectifying arrangement 110 according to an embodiment of the invention.

The LED lighting arrangement 400 again comprises an AC power source 190, comprising an electromagnetic ballast having an inductor L1.

The rectifying arrangement 110 comprises an input interface 111, having a first $I_1$ and second $I_2$ input terminal configured to receive an AC signal from the AC power source 190. The rectifying arrangement comprises a bridge rectifier, formed of four didoes DB1, DB2, DB3 and DB4 that rectify the AC signal from the AC power source 190. The rectified signal is provided at an output terminal $O_1$. A second output terminal $O_2$ provides a ground/reference (and may be connected to a ground/reference as illustrated), and can be omitted in some embodiments. The output terminal(s) provide an output interface for the rectifying arrangement. A smoothing capacitor $C_3$ (previously labelled $C_O$) smooths an output of the rectifying arrangement, e.g. to provide a substantially constant DC signal).

An LED arrangement 130, comprising one or more LEDS D2, D3 is configured to draw power from the output $O_1$ (interface) of the rectifying arrangement 111. In the illustrated example, an LED driver comprises a direct connection between the output of the rectifying arrangement and the LED arrangement 130, although other embodiments may replace this direct connection with another DC-DC converter, e.g. embodied as previously described.

The rectifying arrangement 110 further comprises a clamping arrangement 115. The clamping arrangement here comprises a bidirectional DIAC, here iconic illustrated as being conceptually formed of two back-to-back diodes DB5, DB6. The operation and purpose of the clamping arrangement has been previously described. Other suitable examples for a clamping arrangement, such as those previously noted, may be substituted for the illustrated clamping arrangement.

In particular, the clamping arrangement 115 provides, in response to an abnormal condition of the rectifying arrangement (such as one of the diodes DB1-DB4 breaking and forming an open circuit), a low-impedance path between the two input terminals of the input arrangement; and is configured to continually maintain the low-impedance path between the two input terminals for at least a plurality of continuous cycles of the AC current received at the input arrangement. In particular, the clamping arrangement 115 may irreversibly or irrecoverable become conductive (provide a low-impedance path).

A resistor R1 provides an escape path for current, where appropriate.

Figure 4:
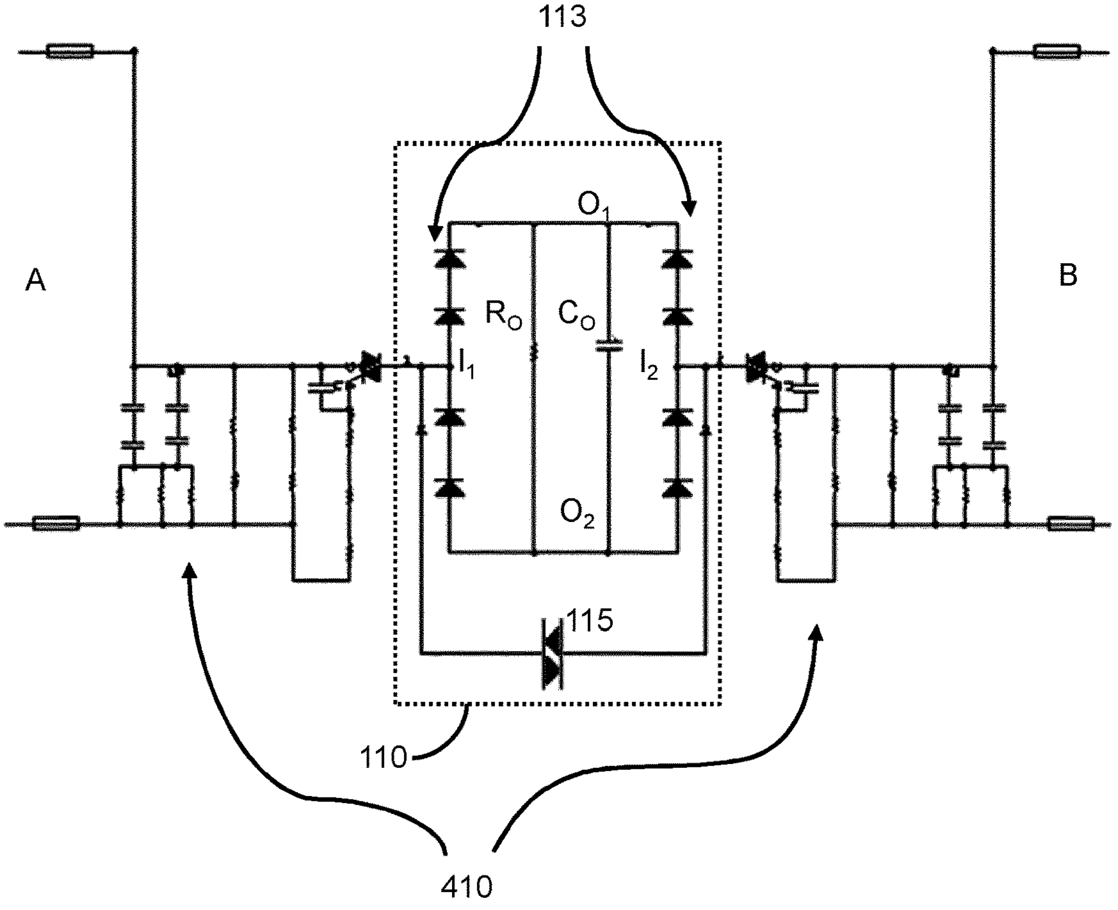
FIG. 4 is a circuit diagram illustrating an embodiment.

FIG. 4 is a circuit diagram illustrating components of a rectifying arrangement 110 according to an embodiment.

The circuit diagram also illustrates additional input circuitry 410 for simulating the filament of a fluorescent lamp before the EM ballast. The additional input circuit 410 is illustrated for the purposes of contextual understanding, and is not essential to the underlying concept of the present invention.

The rectifying circuitry of the rectifying arrangement 110 here comprises a full-bridge rectifier 113 in which one half is placed near end A and the other half is placed near end B, formed of four rectifying branches. The AC power is provided across both ends A and B. A pair of rectifying branches is made conductive during a particular half cycle of an AC power supplied to an input interface connected to the rectifying circuitry, to thereby generate a single-polarity DC power. The operation of a full-bridge rectifier is well known to the skilled person, and shall not be further described for the sake of brevity.

The rectifying arrangement 110 further comprises a capacitor $C_O$ connected to the output arrangement $O_1$, $O_2$ and configured to smooth an output DC current provided by the output arrangement. In the illustrated example, the output arrangement comprises two output terminals, and the capacitor $C_O$ is connected between the two output terminals.

The rectifying arrangement 110 further comprises a resistor $R_O$ connected between the output terminals of the output arrangement. The resistor $R_O$ stands for the LED load.

The clamping arrangement 115 here comprises a bidirectional DIAC configured to (semi-)permanently breakdown when a voltage across the DIAC exceeds a threshold magnitude voltage, as previously described. An example of a suitable DIAC is the K1050SA DIAC.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A rectifying arrangement, adapted to be used with an electromagnetic ballast with an inductor (L1), for an LED driver of an LED lighting unit, the rectifying arrangement comprising:

a rectifying circuit comprising:

an input arrangement formed of two input terminals ($I_1$, $I_2$) configured to connect to an alternating current, AC, power source;

an output arrangement formed of one or more output terminals; and rectifying circuitry connected between the input and output arrangement and configured to rectify an AC voltage received at the input arrangement from the AC power source to provide output DC voltage at the output arrangement, and a clamping arrangement connected between the two input terminals of the input arrangement of the rectifying circuit, wherein the clamping arrangement is configured to, in response to an abnormal operation of the rectifying circuit, wherein the abnormal operation of the rectifying circuit is an open circuit of one rectifying branch of the rectifying circuit such that the electromagnetic ballast could only output current in one polarity of the AC cycles which causes the clamping arrangement to receive an increased input voltage from the electromagnetic ballast, exceeding a threshold magnitude, due to voltage induction caused by the open circuit of the one rectifying branch of the rectifying circuit:

provide a low-impedance path between the two input terminals of the input arrangement; and continually maintain the low-impedance path between the two input terminals for at least a plurality of continuous cycles of the AC current received at the input arrangement.

2. The rectifying arrangement of claim 1, wherein the clamping arrangement is configured, before an abnormal operation of the rectifying circuit occurs, to not provide a low-impedance path between the two input terminals of the input arrangement.

3. The rectifying arrangement of claim 1, wherein the clamping arrangement is configured to, in response to the abnormal operation of the rectifying circuit, continually maintain the low-impedance path between the two input terminals for a substantially permanent period of time.

4. The rectifying arrangement of claim 1, wherein the clamping arrangement is configured to permanently maintain the low-impedance path between the two input terminals in response to the abnormal operation of the rectifying circuit.

5. The rectifying arrangement of claim 1, wherein the threshold magnitude is larger than 1.25 times the forward voltage of the LED lighting unit.

6. The rectifying arrangement of claim 1, wherein the clamping arrangement comprises a bidirectional conductive and non-recoverable component which comprising diode for alternating current (DIAC) type or Thyristor Surge Suppressors (TSS) type component connected between the two input terminals of the rectifying circuit.

7. The rectifying arrangement of claim 1, wherein the rectifying circuitry comprises a bridge rectifier including four rectifying branches, wherein at least one branch comprises at least two diodes, and wherein the abnormal operation of the rectifying circuit comprises an open circuit of one rectifying branch.

8. The rectifying arrangement of claim 1, further comprising a capacitor connected to the output arrangement and configured to smooth an output DC current provided by the output arrangement.

9. The rectifying arrangement of claim 8, wherein the one or more output terminals comprise two output terminals, and the capacitor is connected between the two output terminals.

10. An LED lighting unit to be used with an electromagnetic ballast for a gas discharge lamp, comprising:

a rectifying arrangement, adapted to be used with an electromagnetic ballast with an inductor, for an LED driver of an LED lighting unit, the rectifying arrangement comprising:

a rectifying circuit comprising:

an input arrangement formed of two input terminals configured to connect to an alternating current, AC, power source;

an output arrangement formed of one or more output terminals; and rectifying circuitry connected between the input and output arrangement and configured to rectify an AC voltage received at the input arrangement from the AC power source to provide output DC voltage at the output arrangement, and a clamping arrangement connected between the two input terminals of the input arrangement of the rectifying circuit, wherein the clamping arrangement is configured to, in response to an abnormal operation of the rectifying circuit, wherein the abnormal operation of the rectifying circuit is an open circuit of one rectifying branch of the rectifying circuit such that the electromagnetic ballast could only output current in one polarity of the AC cycles which causes the clamping arrangement to receive an increased input voltage from the electromagnetic ballast, exceeding a threshold magnitude, due to voltage induction caused by the open circuit of the one rectifying branch of the rectifying circuit:

provide a low-impedance path between the two input terminals of the input arrangement; and continually maintain the low-impedance path between the two input terminals for at least a plurality of continuous cycles of the AC current received at the input arrangement; and an LED arrangement, comprising one or more LEDS, configured to receive power from the output arrangement of the rectifying arrangement.

11. The LED lighting unit of claim 10, further comprising an LED driver configured to convert the output DC voltage to a different DC voltage for powering the LED arrangement.

12. An LED lighting arrangement comprising:

a rectifying arrangement, adapted to be used with an electromagnetic ballast with an inductor, for an LED driver of an LED lighting unit, the rectifying arrangement comprising:

a rectifying circuit comprising:

an input arrangement formed of two input terminals configured to connect to an alternating current, AC, power source;

an output arrangement formed of one or more output terminals; and rectifying circuitry connected between the input and output arrangement and configured to rectify an AC voltage received at the input arrangement from the AC power source to provide output DC voltage at the output arrangement, and a clamping arrangement connected between the two input terminals of the input arrangement of the rectifying circuit, wherein the clamping arrangement is configured to, in response to an abnormal operation of the rectifying circuit, wherein the abnormal operation of the rectifying circuit is an open circuit of one rectifying branch of the rectifying circuit such that the electromagnetic ballast could only output current in one polarity of the AC cycles which causes the clamping arrangement to receive an increased input voltage from the electromagnetic ballast, exceeding a threshold magnitude, due to voltage induction caused by the open circuit of the one rectifying branch of the rectifying circuit:

provide a low-impedance path between the two input terminals of the input arrangement; and continually maintain the low-impedance path between the two input terminals for at least a plurality of continuous cycles of the AC current received at the input arrangement; and an AC power source configured to receive a mains AC power from a mains supply and provide an AC power to the input arrangement of the rectifying arrangement, wherein said AC power source comprises an electromagnetic ballast for a gas discharge lamp.

13. The LED lighting arrangement of claim 12, further comprising an LED arrangement, comprising one or more LEDS, configured to receive power from the output arrangement of the rectifying arrangement.

* * * * *